(12) United States Patent
Liu et al.

(10) Patent No.: US 11,571,945 B2
(45) Date of Patent: Feb. 7, 2023

(54) ROOF TOP AIR CONDITIONER UNIT, METHODS FOR PRODUCING, ASSEMBLING AND INSTALLING THE ROOF TOP AIR CONDITIONER UNIT AND VEHICLE WITH THE ROOF TOP AIR CONDITIONER UNIT

(71) Applicant: Dometic Sweden AB, Solna (SE)

(72) Inventors: Louis Liu, JinWan (CN); Chen Jianmin, JinWan (CN)

(73) Assignee: Dometic Sweden AB, Solna (SE)

( * ) Notice: Subject to any disclaimer, the term of this patent is extended or adjusted under 35 U.S.C. 154(b) by 213 days.

(21) Appl. No.: 16/722,938

(22) Filed: Dec. 20, 2019

(65) Prior Publication Data
US 2020/0198438 A1    Jun. 25, 2020

(30) Foreign Application Priority Data

Dec. 21, 2018  (DE) .......................... 1020182228779

(51) Int. Cl.
*B60H 1/00* (2006.01)

(52) U.S. Cl.
CPC ..... *B60H 1/00364* (2013.01); *B60H 1/00535* (2013.01); *B60H 1/00542* (2013.01); *B60H 2001/00235* (2013.01)

(58) Field of Classification Search
CPC ............ B60H 1/00364; B60H 1/00535; B60H 1/00542; B60H 2001/00235
See application file for complete search history.

(56) References Cited

U.S. PATENT DOCUMENTS

| D226,381 | S  | 2/1973  | Harty, Jr. |
| 4,641,502 | A | 2/1987 | Aldrich |
| D284,025 | S  | 5/1986  | Armstrong |
| 4,672,818 | A  | 6/1987  | Roth |
| 4,709,623 | A  | 12/1987 | Roth |
| D300,777 | S  | 4/1989  | Bales |
| D306,341 | S  | 2/1990  | Bales |
| 5,531,641 | A  | 7/1996  | Aldrich |
| 5,848,536 | A  | 12/1998 | Dodge |
| 6,213,197 | B1 | 4/2001  | Ebbeson |

(Continued)

FOREIGN PATENT DOCUMENTS

| AU | 2004202967 | 3/2011 |
| AU | 2007200788 | 9/2011 |

(Continued)

OTHER PUBLICATIONS

Translation of DE 102012018272 (Year: 2014).*

(Continued)

*Primary Examiner* — David J Teitelbaum
(74) *Attorney, Agent, or Firm* — Middleton Reutlinger

(57) ABSTRACT

A roof top air conditioner unit for a vehicle, in particular a recreational vehicle, wherein the roof top air conditioner at least in part is made of expanded polypropylene (EPP). At least one stabilizing and/or connecting element of the roof top air conditioner unit is mold in the section of the roof top air conditioner unit made of EPP. Furthermore, the present invention refers to a method for producing, assembling and installing such roof top air conditioner units and a vehicle having such a roof top air conditioner assembly.

6 Claims, 2 Drawing Sheets

(56) References Cited

U.S. PATENT DOCUMENTS

| | | | |
|---|---|---|---|
| 6,226,999 B1 * | 5/2001 | Suda | B60H 1/3227 62/298 |
| 6,263,689 B1 | 7/2001 | Dodge | |
| 6,449,973 B2 | 9/2002 | Dodge | |
| 6,857,953 B2 | 2/2005 | Malott | |
| 7,140,192 B2 | 11/2006 | Allen | |
| 7,171,822 B2 | 2/2007 | Allen | |
| 7,234,315 B2 | 6/2007 | Allen | |
| 7,237,397 B2 | 7/2007 | Allen | |
| 7,316,119 B2 | 1/2008 | Allen | |
| 7,419,368 B2 | 9/2008 | Milks | |
| D588,479 S | 3/2009 | Giese | |
| 7,739,882 B2 | 6/2010 | Evans | |
| 7,963,117 B2 | 6/2011 | Allen | |
| 8,056,351 B2 | 11/2011 | Marciano | |
| D661,386 S | 6/2012 | Bergin | |
| 8,240,168 B2 | 8/2012 | Holguin | |
| 8,440,143 B2 | 5/2013 | Liptak | |
| 8,535,127 B2 | 9/2013 | Malott | |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| D811,566 S | 2/2018 | Liu | |
| D817,466 S | 5/2018 | Moseley | |
| 9,975,405 B2 | 5/2018 | Siddiqui | |
| D824,499 S | 7/2018 | Williamson | |
| 10,082,345 B1 | 9/2018 | Mihail | |
| 10,093,152 B2 | 10/2018 | Allard | |
| D841,138 S | 2/2019 | Williamson | |
| D850,609 S | 6/2019 | Bergin | |
| D862,668 S | 10/2019 | Moseley | |
| D865,926 S | 11/2019 | Moseley | |
| 10,589,593 B2 | 3/2020 | Westendarp | |
| D884,870 S | 5/2020 | Bergin | |
| 10,675,941 B2 | 6/2020 | Williamson | |
| 10,696,129 B2 | 6/2020 | Bergin | |
| D905,217 S | 8/2020 | Hederstiema | |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2010/0006257 A1 | 1/2010 | Schutz | |
| 2013/0205811 A1 | 8/2013 | Esch | |
| 2014/0223928 A1 | 8/2014 | Esch | |
| 2019/0047354 A1 | 2/2019 | Williamson | |
| 2019/0128551 A1 | 5/2019 | Heral | |
| 2019/0315197 A1 | 10/2019 | Williamson | |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CN | 103237671 A | 8/2013 |
| CN | 103687735 A | 3/2014 |
| CN | 172873 S | 2/2017 |
| CN | 172874 S | 2/2017 |
| CN | 106470856 A | 3/2017 |
| CN | 304097003 S | 4/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| DE | 4421094 A1 | 12/1995 |
| DE | 19654261 | 6/1998 |
| DE | 69503723 | 9/1998 |
| DE | 19730136 | 1/1999 |
| DE | 19733771 C1 | 6/1999 |
| DE | 19937000 A1 | 2/2001 |
| DE | 10020086 A1 | 10/2001 |
| DE | 10215823 A1 | 10/2003 |
| DE | 69817899 | 10/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 202004017266 | 4/2006 |
| DE | 202005000560 | 6/2006 |
| DE | 102005030362 | 11/2006 |
| DE | 602004004480 | 3/2007 |
| DE | 202006001374 | 7/2007 |
| DE | 202006001376 | 7/2007 |
| DE | 202006001377 | 7/2007 |
| DE | 202006009803 | 12/2007 |
| DE | 102006047369 A1 | 4/2008 |
| DE | 202007006292 | 10/2008 |
| DE | 102007038716 | 2/2009 |
| DE | 602005012194 | 2/2009 |
| DE | 202008003123 | 9/2009 |
| DE | 102008028066 | 12/2009 |

(56) References Cited

FOREIGN PATENT DOCUMENTS

| | | | |
|---|---|---|---|
| DE | 602007009584 | 11/2010 | |
| DE | 502007006725 | 4/2011 | |
| DE | 202011101256 | 12/2011 | |
| DE | 202010012578 | 2/2012 | |
| DE | 102011103359 A1 | 11/2012 | |
| DE | 102012018272 A1 * | 3/2014 | ......... B60H 1/00371 |
| DE | 102012216039 A1 | 5/2014 | |
| DE | 202011002986 | 7/2014 | |
| DE | 202013004158 | 9/2014 | |
| DE | 102014217170 A1 | 3/2016 | |
| DE | 102016220768 | 4/2018 | |
| DE | 112017000915 | 10/2018 | |
| DE | 102017207797 | 11/2018 | |
| DE | 102017214941 | 2/2019 | |
| DE | 102017219353 | 5/2019 | |
| DE | 102017207797 | 8/2019 | |
| DE | 112017005541 | 8/2019 | |
| DE | 102018204532 | 9/2019 | |
| DE | 102018206490 | 10/2019 | |
| DE | 102019205194 | 10/2019 | |
| DE | 102017219353 | 11/2019 | |
| DE | 102018206854 | 11/2019 | |
| DE | 112018003284 | 3/2020 | |
| DE | 202015009786 | 3/2020 | |
| DE | 212018000248 | 3/2020 | |
| DE | 212018000249 | 3/2020 | |
| DE | 112018003288 | 4/2020 | |
| DE | 102018222877 | 6/2020 | |
| DE | 102018222877 A1 | 6/2020 | |
| DE | 112018005002 | 7/2020 | |
| DE | 112018005883 | 7/2020 | |
| EP | 700801 | 3/1996 | |
| EP | 869018 | 10/1998 | |
| EP | 892225 | 1/1999 | |
| EP | 1538009 | 6/2005 | |
| EP | 1634740 | 3/2006 | |
| EP | 1721765 | 11/2006 | |
| EP | 1752717 | 2/2007 | |
| EP | 1826041 | 8/2007 | |
| EP | 1870270 | 12/2007 | |
| EP | 1925889 | 5/2008 | |
| EP | 1955946 | 8/2008 | |
| EP | 1988612 | 11/2008 | |
| EP | 2189312 | 5/2010 | |
| EP | 2192040 | 6/2010 | |
| EP | 2196390 | 6/2010 | |
| EP | 2 061 666 B1 | 9/2010 | |
| EP | 2433658 | 3/2012 | |
| EP | 2665611 | 10/2014 | |
| EP | 2178710 | 11/2015 | |
| EP | 2616258 | 2/2016 | |
| EP | 3113965 | 1/2017 | |
| EP | 3241695 | 4/2018 | |
| EP | 2714440 | 5/2018 | |
| EP | 2994326 | 7/2018 | |
| EP | 3401619 | 11/2018 | |
| EP | 3411250 | 12/2018 | |
| EP | 3476630 | 5/2019 | |
| EP | 3543047 | 9/2019 | |
| EP | 3564564 | 11/2019 | |
| WO | 2006128522 A1 | 12/2006 | |
| WO | 2009021994 A1 | 2/2009 | |
| WO | 2012034695 A1 | 3/2012 | |
| WO | 2012113538 A1 | 8/2012 | |
| WO | 2012159749 A1 | 11/2012 | |
| WO | 2014143181 A1 | 9/2014 | |
| WO | 2014180559 A1 | 11/2014 | |
| WO | WO-2016030203 A1 * | 3/2016 | ......... B60H 1/00371 |
| WO | 2017143393 A1 | 8/2017 | |
| WO | 2017143394 A1 | 8/2017 | |
| WO | 2018096127 A1 | 5/2018 | |
| WO | 2019038023 A1 | 2/2019 | |
| WO | 2019082168 A1 | 5/2019 | |
| WO | 2019097448 A1 | 5/2019 | |
| WO | 2019207451 A2 | 10/2019 | |
| WO | 2019229706 A1 | 12/2019 | |
| WO | 2019244011 A1 | 12/2019 | |
| WO | 2020143636 A1 | 7/2020 | |
| WO | 2020151541 A1 | 7/2020 | |
| WO | 2020188485 A2 | 9/2020 | |
| WO | 2020192746 A1 | 10/2020 | |

OTHER PUBLICATIONS

Office Action for Germany Patent Application No. 102018222877.9 dated Nov. 29, 2019.
DE Application No. 102018222877.9 filed on Dec. 21, 2018 entitled "Roof Top Air Conditioner Unit, Methods for Producing, Assembling and Installing the Roof Top Air Conditioner Unit and Vehicle with the Roof Top Air Conditioner Unit".
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dima.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/GB/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd-ssl#q=https://www.youtube.com/watch?v%3DSPK17XEvVL0&spf=1495819902591).

(56) References Cited

OTHER PUBLICATIONS

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
U.S. Appl. No. 16/384,376, filed Apr. 15, 2019 titled Air Distribution Apparatus.
U.S. Appl. No. 17/003,309, filed Aug. 26, 2020 titled Component of Climatization System or Window System.
U.S. Appl. No. 17/003,310, filed Aug. 26, 2020 titled Air Conditioning Unit.
U.S. Appl. No. 17/003,317, filed Aug. 26, 2020 titled Climatization and Window System for Mobile Homes.
U.S. Appl. No. 17/049,731, filed Oct. 22, 2020 titled Damped Mobile Compressor.
Design U.S. Appl. No. 29/594,476, filed Feb. 17, 2017 titled Shroud Assembly.
Design U.S. Appl. No. 29/604,433, filed May 17, 2017 titled Air Conditioning Apparatus.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
Design U.S. Appl. No. 29/715,592, filed Dec. 3, 2019 titled Filter Housing.
Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
Decision to Grant Issued in German Patent Application No. 102018222877.9 dated Jun. 24, 2020.
Office Action Opposition for Germany Patent Application No. 102018222877.9 dated Jul. 8, 2021.

\* cited by examiner

ROOF TOP AIR CONDITIONER UNIT, METHODS FOR PRODUCING, ASSEMBLING AND INSTALLING THE ROOF TOP AIR CONDITIONER UNIT AND VEHICLE WITH THE ROOF TOP AIR CONDITIONER UNIT

The present embodiments refer to a roof top air conditioner unit, methods for producing, assembling and/or installing the roof top air conditioner unit and a vehicle comprising the roof top air conditioner unit.

For roof top air conditioner units provided for vehicles, and in particular provided for recreational vehicles like caravans or campers, high requirements with regard to stability and reduced weight have to be met. At the same time a reliable and quite resistant overall configuration of the roof top air conditioner unit and of its coupling to the vehicle has to be ensured.

In the past various different attempts to solve the above problem have been made. However, although known roof top air conditioner units work quite well in this regard there is still room for enhancements for a roof top air conditioner unit in order to solve all the above problems in a satisfactory manner at once.

Accordingly, the problem to be solved by the present embodiments provides a roof top air conditioner unit as well as corresponding methods for production, assembling and/or installing the roof top air conditioner unit as well as a vehicle equipped with the roof top air conditioner unit overcoming all the above problems at once.

According to the present embodiments, a roof top air conditioner unit for a vehicle, in particular for a recreational vehicle, is made at least in part of expanded polypropylene (EPP), wherein the roof top air conditioner unit has at least one stabilizing and/or connecting element mold in the section of the roof top air conditioner unit made of EPP.

Due to the favorable material properties of EPP providing the roof top air conditioner unit made at least in part of EPP results in a light weight and robust configuration. The stabilizing elements are further stabilizing the structure of corresponding sections of the roof top air conditioner unit and improve the overall stability of the roof top air conditioner unit. The connection elements, moreover, provide a reliable solution to couple the corresponding section of the roof top conditioner unit to other sections or elements of the roof top air conditioner unit or to the vehicle. As the stabilizing and/or connection elements are directly mold into the EEP, a reliable connection between the stabilizing and/or connection elements and the corresponding section of the roof top air conditioner unit is realized. In particular, the stabilizing and/or connection elements are configured to both stabilize the overall construction of the roof top air conditioner unit and to connect various sections or elements of the roof top air conditioner unit to each other and to connect the roof top air conditioner unit to the vehicle.

According to some embodiments of the roof top air conditioner, there is at least one housing and/or one base pan at least in part, but optionally completely made of EPP.

The housing and/or the base pan of the roof top air conditioner unit are the largest parts thereof, which is why providing these parts substantially made of EPP results in a high reduction in weight of the overall roof top air conditioner unit.

According to a further embodiment, the at least one stabilizing and/or connecting element is a nut configured to be engaged with a corresponding fastening means for assembling and/or installing the roof top air conditioner unit.

Nuts are a well-known and reliable solution of providing the stabilizing and/or connecting element.

According to a further embodiment, the at least one stabilizing and/or connecting element has at least one stabilizing protrusion extending transversely to a longitudinal direction of the stabilizing and/or connecting element. In particular, the at least one stabilizing and/or connection element has a t-beam shaped form. In addition thereto or alternatively, the at least one stabilizing and/or connecting element has at least one coupling bore provided therethrough to increase the contact area and the interlocking between the stabilizing and/or connecting element and the corresponding section of the roof top air conditioner unit made of EPP.

Such features allow to improve the coupling between the stabilizing and/or connecting elements and the corresponding section for the roof top air conditioner unit made of EPP.

According to some embodiments, the at least one stabilizing and/or connecting element is made of metal.

Metal, in general, is a well-known material that is easy to process and very robust. Thus, in according to some embodiments, metal depicts one choice as material for the stabilizing and/or connecting elements. However, other materials may be utilized.

According to some embodiments, a method for producing a roof top air conditioner unit for a vehicle, in particular for a recreational vehicle, comprises the steps of casting the roof top air conditioner unit at least in part out of expanded polypropylene (EPP) and molding at least one stabilizing and/or connecting element of the roof top air conditioner unit into the section of the roof top air conditioner unit made of EPP.

These steps in particular are performed as one production step, i.e. at the same time. The method thus allows to achieve the above-described roof top air conditioner unit and thus the thereto related advantages (see above).

According to some embodiments at least the housing and/or the base pan of the roof top air conditioner unit is at least in part, but optionally completely cast out of EEP, the at least one stabilizing and/or connecting element is provided as nut configured to be engaged with a corresponding fastening means for assembling and/or installing the roof top air conditioner, and/or the at least one stabilizing and/or connecting element is formed from metal.

A method for assembling and/or installing a roof top air conditioner unit or a roof top air conditioner unit produced with a method comprises the step of engaging at least one fastening means of the roof top air conditioner unit with the at least one stabilizing and/or connecting element.

This method results in a configuration for the roof top air conditioner unit having the above-described advantages.

According to some embodiments, a vehicle, in particular a recreational vehicle, comprises a roof top air conditioner unit or a roof top air conditioner unit produced with a method.

Such a vehicle has the above described advantages related to the roof top air conditioner unit.

A more complete appreciation of the invention and many of the attendant advantages thereof will be readily obtained as the same becomes better understood by reference to the following description when considered in connection with the accompanying drawings, wherein.

In the following, an exemplary embodiment is described with reference to the accompanying drawings.

Figure 1:
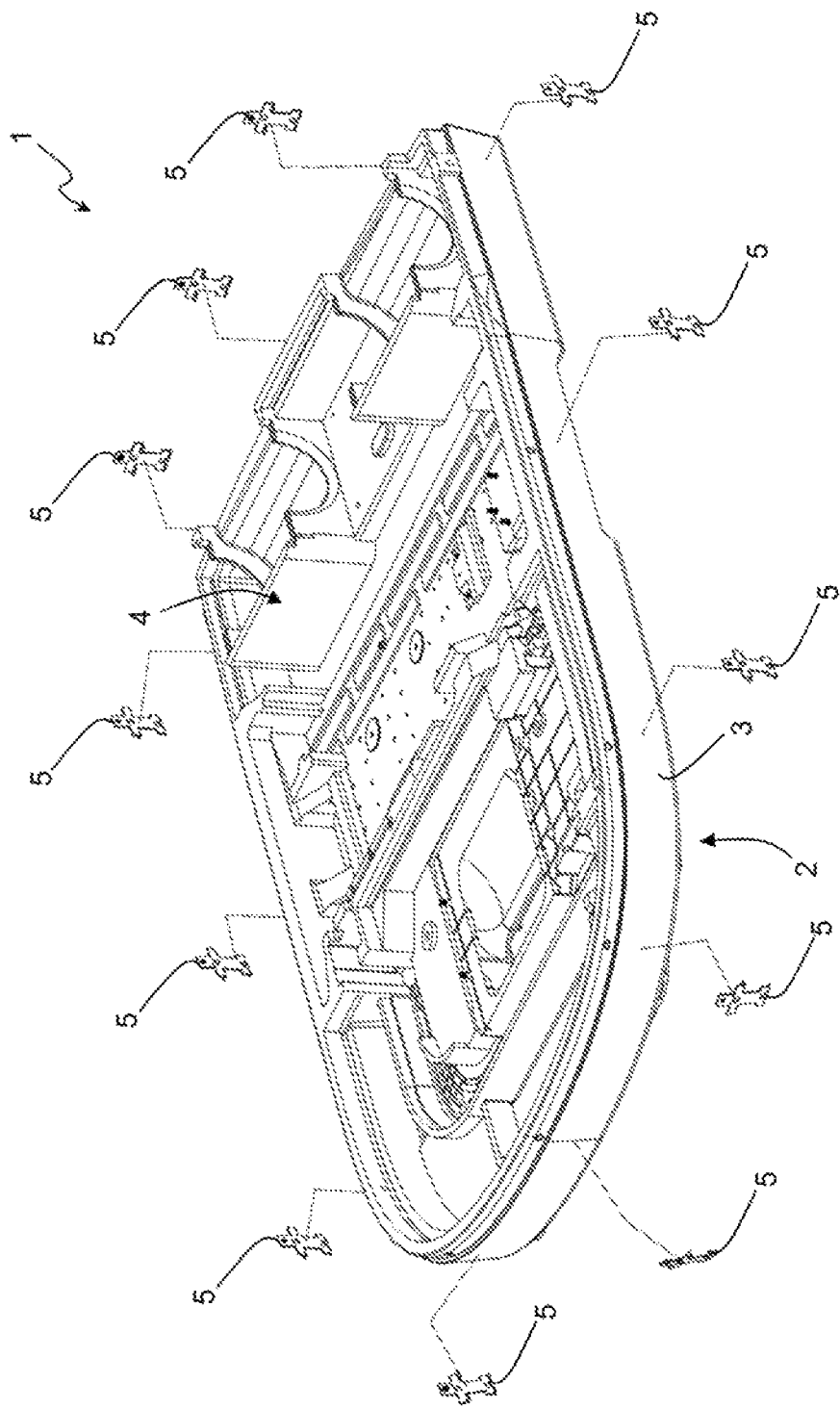
FIG. 1 is an inclined spatial view of a base pan of a roof top air conditioner unit according to an embodiment.

In FIG. 1, a base pan 1 of a roof top air conditioner unit and the corresponding stabilizing and/or connecting elements are illustrated.

Besides the base pan 1, the corresponding roof top air conditioner unit has various other elements like the ones of a cooling circuit (not illustrated) and a top housing/cover. However, as the principle structure of roof top air conditioner units is well known and of no specific importance for the present disclosure, for the sake of brevity, only the special technical features will be described in more detail.

The base pan 1 has a base section 2. The base pan 1 further has a frame section 3, the frame section 3 being circumferentially coupled to the base section 2 to form an inner area of the base pan 1. Further, the base pan 1 has a special installation configuration 4 provided on the base section 2. The installation configuration 4 has various different sections for coupling other elements of the roof top air conditioner unit to the base pan 1, dividing the inner area of the base pan 1 in various distinct sections. These sections are provided to accommodate distinct elements of the roof top air conditioner unit, etc.

As the concrete structure of the installation configuration 4 highly depends on the individual setup of the roof top air conditioner unit and is not directly linked to the present embodiments, for the sake of brevity a detailed description of the various illustrated sections of the installation configuration 4 is omitted.

In the illustrated embodiment the whole base pan 1 is made of expanded polypropylene (EPP). Using EPP for the base pan 1 results in a light weight overall configuration. Moreover, EPP is extremely resistant to external environmental influences like humidity or UV-radiation.

Figure 2:
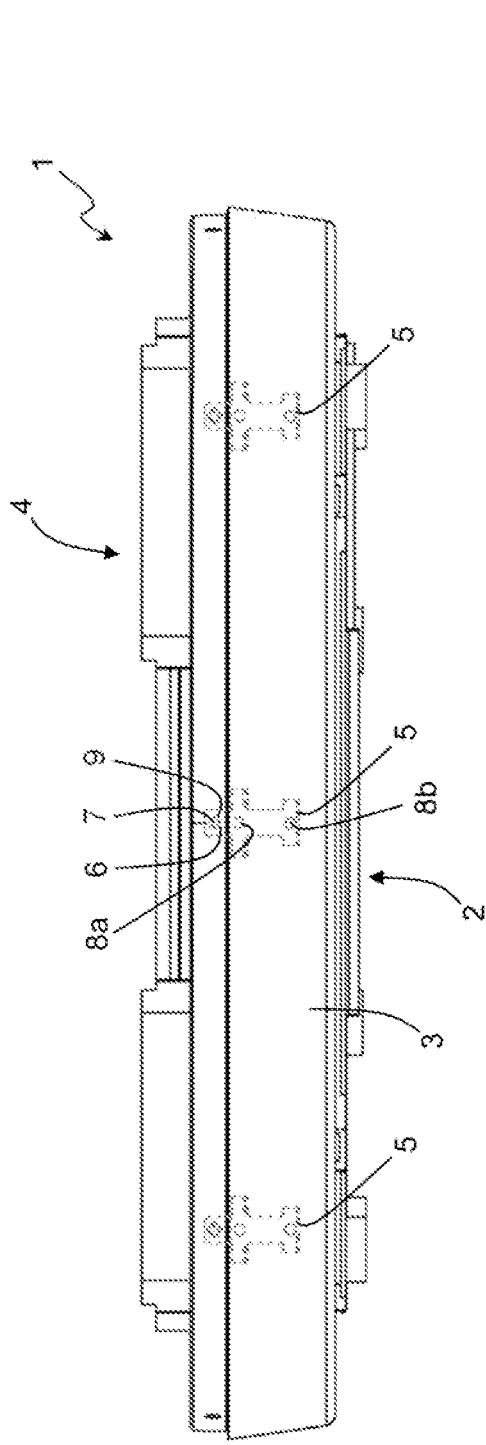
FIG. 2 is a front view of the base pan of FIG. 1.
Figure 3:
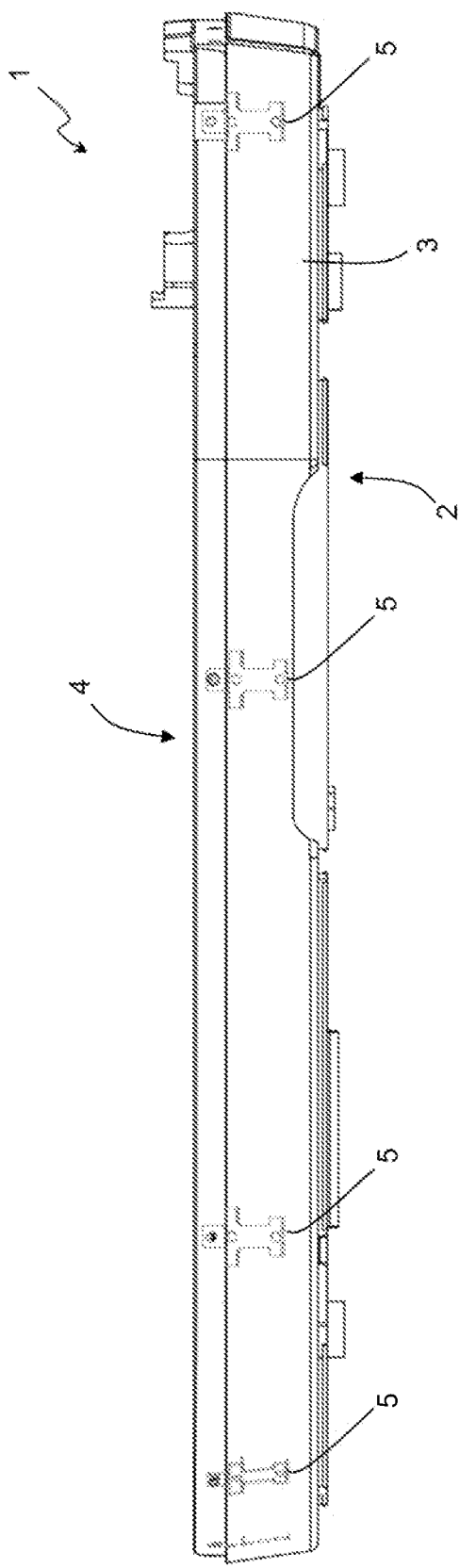
FIG. 3 is a side view of the base pan of FIGS. 1 and 2.

As illustrated in FIGS. 2 and 3, the various stabilizing and/or coupling elements 5 are illustrated with doted lines. A plurality of stabilizing and/or coupling elements 5, in the present embodiment in particular 12 (but also other numbers are possible), are mold into the EPP of the base pan 1. By using the stabilizing and/or coupling elements 5 the base pan 1 can be coupled to other elements of the roof top air conditioner unit like the cover thereof.

Here, the stabilizing and/or connecting elements 5 are provided in the technical design of a basically t-beam shaped metal sheet nuts 5 which is mold in the frame section 3 of the base pan 1. Each of the metal sheet nuts 5 has an additional fastening strap 6 with a threaded fixing bore 7 as well as two coupling bores 8a, 8b. As is illustrated in FIG. 2, each threaded fixing bore 7 is aligned with a through hole 9 within the frame section 3 of the base pan 1. Hence, fastening means (not illustrated), like for example screws, can be guided through the through holes 9 an threaded with the threaded fixing bores 7 of the metal sheet nuts 5 in order to couple other elements of the roof top air conditioner unit to the base pan 1 or the base pan 1 to the vehicle.

The t-beam shaped form of the metal sheet nuts 5 and the coupling bores 8a, 8b are provided to increase the contact area between the metal sheet nuts 5 and the frame section 3 of the base pan 1 and thus to strengthen the coupling between them.

Although the illustrated embodiment of the stabilizing and/or connecting elements 5 is one possiblity, of course also various other configurations for the stabilizing and/or coupling elements 5 are possible.

For example, the stabilizing and/or connecting elements 5 can be provided solely as stabilizing elements being not configured to be coupled with any further fastening means.

Further, the various stabilizing and/or connecting elements 5 can be made of other appropriate material than metal.

Of course, besides the t-shaped form it is possible and within the scope of the present invention to design the stabilizing and/or connecting elements in other forms and shapes including three-dimensional forms.

The illustrated embodiment has been described with reference to the base pan 1 of a roof top air conditioner unit only. However, also any other element of the roof top air conditioner unit can be made of EPP with corresponding stabilizing and/or connecting elements mold therein.

As the method for producing, assembling and installing the roof top air conditioner unit according to the present embodiments can be performed by a skilled artisan, for the sake of brevity no specific description thereof will be given here.

Finally, it is pointed out that a person skilled in the art has many possibilities of adaptation and variation of the above described embodiment according to the present invention, which, however, do not lead away from the core and consequently from the scope of protection.

REFERENCE NUMERALS

1 Base pan
2 base section
3 frame section
4 installation configuration
5 stabilizing and/or connecting elements/metal sheet nut
6 fastening strap
7 fixing bore
8a/8b coupling bore
9 through hole

The invention claimed is:

1. A roof top air conditioner unit for a recreational vehicle, comprising:
the roof top air conditioner unit at least in part is made of expanded polypropylene (EPP), wherein the roof top air conditioner unit has a plurality of stabilizing and/or connecting elements each formed of a material differing from EPP and each molded-in a corresponding plurality of locations of the part of the roof top air conditioner unit made of EPP, wherein each of the plurality of stabilizing and/or connecting elements has at least one stabilizing protrusion extending transversely to a longitudinal direction of the stabilizing and/or connecting element, wherein each of the plurality of stabilizing and/or connecting elements has a t-beam shaped form and partially extends from the part.

2. The roof top air conditioner unit of claim 1, wherein the roof top air conditioner unit has at least one housing and/or one base pan,
wherein the at least one housing and/or the one base pan is at least in part, made of EPP.

3. The roof top air conditioner unit of claim 1, wherein the at least one stabilizing and/or connecting element is a nut and is configured to be engaged with a corresponding fastening means for assembling and/or installing the roof top air conditioner unit.

4. The roof top air conditioner unit of claim 1,
wherein the at least one stabilizing and/or connecting element has at least one coupling bore provided therethrough to increase contact area and the interlocking between the stabilizing and/or connecting element and the corresponding location of the roof top air conditioner unit made of EPP.

5. The roof top air conditioner unit of claim 1, wherein the at least one stabilizing and/or connecting element is made of metal.

6. The recreational vehicle of claim 5, further wherein said element is formed of a metal.

* * * * *

UNITED STATES PATENT AND TRADEMARK OFFICE
CERTIFICATE OF CORRECTION

| | |
|---|---|
| PATENT NO. | : 11,571,945 B2 |
| APPLICATION NO. | : 16/722938 |
| DATED | : February 7, 2023 |
| INVENTOR(S) | : Louis Liu et al. |

It is certified that error appears in the above-identified patent and that said Letters Patent is hereby corrected as shown below:

On the Title Page

Item (72) Inventors section:
"Chen Jianmin, JinWan (CN)"
Should be corrected to read:
--Jianmin Chen, JinWan (CN)--

Signed and Sealed this
Eleventh Day of July, 2023

Katherine Kelly Vidal
*Director of the United States Patent and Trademark Office*